(12) United States Patent
Penner et al.

(10) Patent No.: US 8,161,389 B1
(45) Date of Patent: Apr. 17, 2012

(54) AUTHORING TOOL SHARABLE FILE FORMAT

(75) Inventors: Robert Penner, Kelowna (CA); Paul Kohlhaas, San Francisco, CA (US)

(73) Assignee: Adobe Systems Incorporated, San Jose, CA (US)

(*) Notice: Subject to any disclaimer, the term of this patent is extended or adjusted under 35 U.S.C. 154(b) by 965 days.

(21) Appl. No.: 11/931,633

(22) Filed: Oct. 31, 2007

(51) Int. Cl.
  *G06F 3/00* (2006.01)
  *G06F 3/01* (2006.01)

(52) U.S. Cl. ........ 715/731; 715/716; 715/733; 715/742; 715/751

(58) Field of Classification Search ................ 715/730, 715/731, 733, 742, 750, 751, 716
See application file for complete search history.

(56) References Cited

U.S. PATENT DOCUMENTS

| | | | | |
|---|---|---|---|---|
| 5,852,435 A * | 12/1998 | Vigneaux et al. | ............. | 345/428 |
| 6,199,082 B1 * | 3/2001 | Ferrel et al. | .................... | 715/205 |
| 6,332,147 B1 * | 12/2001 | Moran et al. | ................... | 715/203 |
| RE38,401 E * | 1/2004 | Goldberg et al. | ............. | 715/720 |
| RE38,609 E * | 10/2004 | Chen et al. | ..................... | 715/730 |
| 6,807,361 B1 * | 10/2004 | Girgensohn et al. | ............ | 386/52 |
| 6,957,195 B1 * | 10/2005 | Kenyon et al. | ................... | 705/58 |
| 7,149,974 B2 * | 12/2006 | Girgensohn et al. | ......... | 715/723 |
| 7,213,051 B2 * | 5/2007 | Zhu et al. | ........................ | 709/205 |
| 2003/0093757 A1 * | 5/2003 | Silverbrook et al. | ......... | 715/512 |
| 2006/0008789 A1 * | 1/2006 | Gerteis | .......................... | 434/365 |
| 2007/0028172 A1 * | 2/2007 | Greer et al. | .................... | 715/705 |
| 2007/0038643 A1 * | 2/2007 | Epstein | ........................... | 707/10 |
| 2007/0186157 A1 * | 8/2007 | Walker et al. | ................. | 715/530 |
| 2007/0203841 A1 * | 8/2007 | Maes | .............................. | 705/52 |
| 2008/0040322 A1 * | 2/2008 | Rucker et al. | ..................... | 707/3 |
| 2009/0019367 A1 * | 1/2009 | Cavagnari et al. | ............ | 715/716 |

* cited by examiner

*Primary Examiner* — Nicholas Augustine
(74) *Attorney, Agent, or Firm* — Kilpatrick Townsend & Stockton LLP

(57) ABSTRACT

Systems and methods which provide a markup language based file format for storing authoring tool content are shown. The markup language based file format of embodiments provides an aggregated content object containing various assets. A container structure is preferably provided for a plurality of assets comprising the aggregated content object. The assets of embodiments of the present invention include different types of assets, including content assets which contain content and packaging assets which contain aggregated content object information. Content assets may comprise various types or forms of media, such as graphics, video, audio, text, etc. Packaging assets may be in a markup language format, such as may be utilized to provide robust information regarding the aggregated content object and assets thereof. The markup language based file format of embodiments of the invention facilitates access to all or portions of the aggregated content by various authoring tools.

25 Claims, 3 Drawing Sheets

AUTHORING TOOL SHARABLE FILE FORMAT

TECHNICAL FIELD

The present invention is directed generally to data file formats and, more particularly, to providing sharable data file formats.

BACKGROUND OF THE INVENTION

Various authoring tools are widely used for creating, editing, presenting, and/or publishing content for presentation. Such content may be textual, graphical, still, moving, multimedia, interactive, etc., as well as combinations thereof. Particular authoring tools may be uniquely tailored to provide authoring functionality specifically for creating and/or editing one or more particular type or form of content. Thus, a particular authoring tool may be best suited for use depending upon the particular type or form of content.

For example, the ILLUSTRATOR® graphic editor software available from Adobe Systems Incorporated of San Jose, Calif., (the assignee of the present invention, and referred to herein as "Adobe") provides an authoring tool uniquely tailored to facilitate creating, editing, presenting, and publishing drawings and illustrations. The PHOTOSHOP® graphic editor software available from Adobe provides an authoring tool uniquely tailored to facilitate creating, editing, presenting, and publishing photographs, films, and videos. The WAVEPAD sound editor software available from NCH Swift Pty. Ltd. of Canberra, Australia, provides an authoring tool uniquely tailored to facilitate creating, editing, presenting, and publishing sound tracks.

Often the content being created, edited, presented, and/or published is not limited to one type or form. For example, rich multimedia content, often providing a combination of video, sound, graphics, and text, has become pervasive. Accordingly, authoring tools have been developed to facilitate creating, editing, presenting, and/or publishing such multimedia content. For example, the FLASH® development software available from Adobe provides an authoring tool for creating and delivering interactive multimedia content. The FLEX™ development software also available from Adobe provides an authoring tool for creating rich Internet applications. Such multimedia content authoring tools, although providing features uniquely tailored to facilitate combining media of various types or forms into multimedia content, often do not provide a full feature set with respect to authoring content of any particular type or form.

Multimedia content authoring tools have heretofore utilized proprietary binary file formats to store individual assets (e.g., content of various types used to create the multimedia content) as a single object during authoring. For example, although perhaps originally provided as individual files, of various file formats associated with a particular type or form of content (e.g., PEG, MPEG, FLY, WMV, MP3, WAV, PNG, GIF, TXT, etc.), the authoring tool will aggregate the assets forming the multimedia content into the same binary file. Although such a binary file may follow a published standard, such as a structured storage standard (e.g., COM structured storage or OLE structured storage), the particular format of the binary file is proprietary. For example, the location of particular assets in the binary file, the order of assets in the binary file, metadata associated with the assets in the binary file, etc. is proprietary to the authoring tool.

The foregoing binary files often provide advantages in efficiently storing the content. However, these files are typically not directly accessible by software, such as other authoring tools, other than the authoring tools that created them. Not only is the binary file not compatible with other software, but the assets within the binary file are likewise not accessible to other software. Accordingly, it often is very time consuming and difficult for an author of the content to edit an asset of multimedia content created using a multimedia authoring tool. For example, assuming the author wishes to edit an asset in a way not supported by the multimedia authoring tool (e.g., to remove "red eye" from a photograph used in a multimedia presentation), the author often must load an original or native copy (e.g., JPEG file for the photograph in this example) into an authoring tool providing the desired authoring feature, make the desired edits, save the edited asset in the original or native format, and then re-import the asset into the multimedia content using the multimedia authoring tool.

BRIEF SUMMARY OF THE INVENTION

The present invention is directed to systems and methods which provide a markup language based file format for storing authoring tool content. The markup language based file format of embodiments of the invention provides an aggregated content object containing various content. Such content may comprise various types or forms of media, such as graphics, video, audio, text, etc.

An aggregated content object preferably provides a container structure for a plurality of assets. The assets of embodiments of the present invention include different types of assets, including content assets which contain content and packaging assets which contain aggregated content object information. The assets may be in any of a number of forms and/or formats. For example, content assets may be in a format native to an authoring tool creating the aggregated content object, content assets may be in a format native to another authoring tool or other software application, content assets may be in a format adapted to be readily accessible to a number of authoring tools or other software application, and/or content assets may be in one or more standardized or open formats, such as may be directly accessible by a plurality of authoring tools or other software applications. Packaging assets may be in a markup language format (e.g., using extensible markup language (XML)), such as may be utilized to provide robust information regarding the aggregated content object and assets thereof.

The foregoing aggregated content object preferably defines a hierarchy of assets. For example, one or more packaging assets may be provided at a highest level of the hierarchy wherein the markup language thereof identifies the aggregated content object, identifies the assets associated therewith, and defines links and interaction among and between the assets. Various content assets may be provided in a hierarchy, such as to provide a higher level content asset which includes one or more lower level content assets.

The markup language based file format of embodiments of the invention facilitates access to all or portions of the content, such as the entire aggregated content object or individual assets, by various authoring tools. For example, although an aggregated content object may have been created using a particular multimedia authoring tool, another multimedia authoring tool may be utilized to access the aggregated content object, such as for creating, editing, presenting, and/or publishing content. Similarly, although an aggregated content object may have been created using a multimedia authoring tool, an authoring tool uniquely tailored to provide authoring functionality specifically for creating and/or editing one or more particular type or form of content may be utilized to access a content asset of the aggregated content object.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWING

For a more complete understanding of the present invention, reference is now made to the following descriptions taken in conjunction with the accompanying drawing, in which.

DETAILED DESCRIPTION OF THE INVENTION

Figure 1:
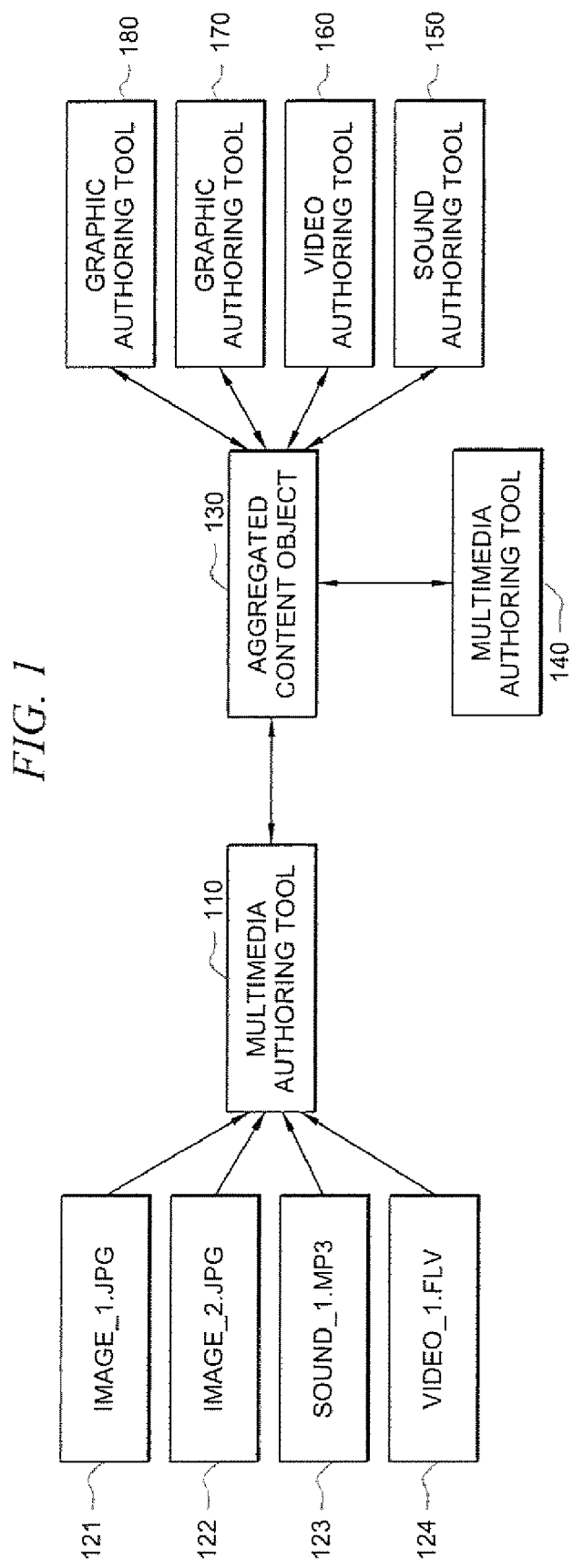
FIG. 1 shows a high level block diagram of a system adapted according to an embodiment of the present invention.

Directing attention to FIG. 1, a high level block diagram of a system adapted according to an embodiment of the present invention is shown. In the embodiment of FIG. 1, multimedia authoring tool 110, such as may comprise a version of the FLASH® development software adapted according to the present invention, is utilized to create, edit, present, and/or publish multimedia content for presentation using various source content. The source content utilized by multimedia authoring tool 110, such as source content 121-124, may be created by one or more other authoring tools, such as authoring tools 140-180. Additionally or alternatively, content included in the multimedia content may be originally sourced by multimedia authoring tool 110. The foregoing content may comprise various types or forms of media, such as graphics (e.g., images of source content 121 and 121), video (e.g., video of source content 124), audio (e.g., sound of source content 123), text, etc.

Irrespective of the original source of the content, multimedia authoring tool 110 provides aggregated content object 130, comprising a markup language based file format according to embodiments of the invention, containing various content. Although various markup languages may be utilized in implementing embodiments of the invention, embodiments of aggregated content object 130 will be described herein with reference to use of extensible markup language (XML). Aggregated content object 130 preferably provides a container structure for a plurality of assets, ones of which correspond to the aforementioned various content. Detail with respect to a preferred embodiment configuration of aggregated content object 130 is provided below with reference to FIG. 2.

The markup language based file format of embodiments of the invention facilitates access to all or portions of the content, such as the entire aggregated content object or individual assets, by various authoring tools. For example, although aggregated content object 130 may have been created using multimedia authoring tool 110, multimedia authoring tool 140, such as may comprise the FLEX™ development software available from Adobe, may be utilized to access aggregated content object 130 for creating, editing, presenting, and/or publishing content. Similarly, portions of aggregated content object 130 may accessed by authoring tools uniquely tailored to provide authoring functionality specifically for creating and/or editing one or more particular type or form of content. For example, authoring tool 180, adapted to provide graphic authoring functionality, may be utilized to directly access assets of aggregated content object 130 corresponding to images of source content 121 and source content 122. Authoring tool 160, adapted to provide video authoring functionality, may be utilized to directly access assets of aggregated content object 130 corresponding to a video of source content 124. Authoring tool 150, adapted to provide video authoring functionality, may be utilized to directly access assets of aggregated content object 130 corresponding to sound of source content 123.

According to embodiments of the invention, the markup language based file format facilitates the foregoing access to portions of aggregated content object 130 simultaneously by multiple ones of the authoring tools. For example, although multimedia authoring tool 110 may be presently operated by a user thereof in creating or editing aggregated content object 130, one or more of authoring tools 140-180 may concurrently access an asset thereof for editing.

Figure 2:
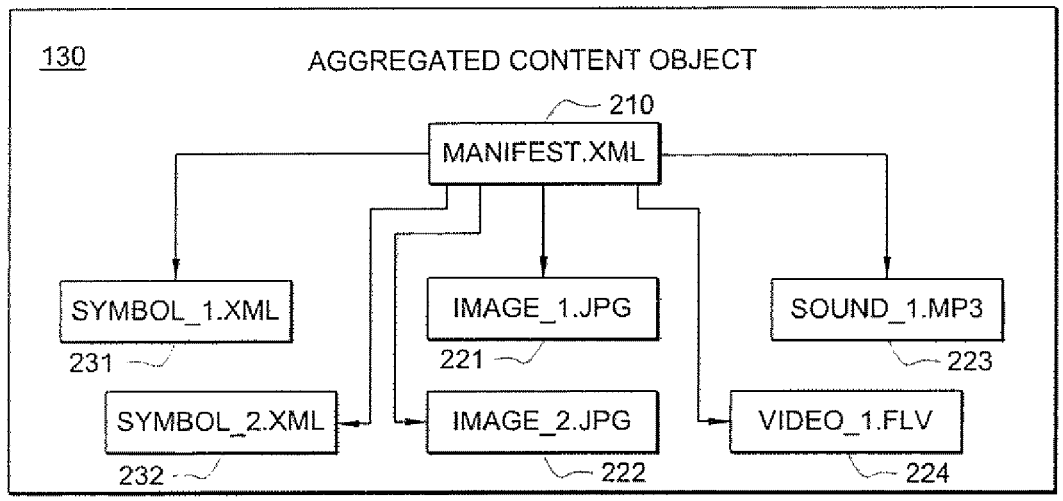
FIG. 2 shows detail with respect to an aggregated content object according to an embodiment of the present invention.

Directing attention to FIG. 2, detail with respect to an embodiment of markup language based file format of aggregated content object 130 is shown. Specifically, aggregated content object 130 of FIG. 2 is shown to include a plurality of assets, here assets 210, 221-224, 231, and 232, associated to form an aggregated object. Such an object may be packaged using a universal container format (UCF) technique, wherein the container format, particular asset contents, container libraries, and/or the like are defined such that a plurality of different software applications may readily access the container and/or portions thereof. Embodiments of the invention utilize a compressed "zip" container file format (e.g., a file object consistent with that resulting from operation of the PKZIP or WINZIP file compression software applications) in providing a plurality of assets as an aggregated content object as described herein. Of course, other container formats may be utilized according to embodiments of the invention, such as a file/folder structure, linked list, object linking and embedding (OLE), etc., if desired.

The assets of embodiments of aggregated content object 130 preferably include different types of assets. For example, asset 210 of the illustrated embodiment comprises a packaging asset whereas assets 221-224, 231, and 232 comprise content assets. One or more of the foregoing packaging assets may be provided at a highest level of the hierarchy wherein the markup language thereof identifies the aggregated content object, identifies the content assets associated therewith, and defines links and interaction among and between the content assets. One or more of the foregoing content assets preferably provide content portions utilized in forming desired content. Other types of assets, such as meta assets, may additionally or alternatively be utilized according to embodiments of the invention.

Packaging assets of embodiments of the invention preferably include information regarding the aggregated content object and/or assets thereof. For example, asset 210 of the illustrated embodiment comprises a manifest of assets which comprise aggregated content object 130. Packaging asset 210 may comprise, for example, XML code providing reference, pointers, or links to each of assets 221-224, 231, and 232, thereby identifying each of these assets with aggregated content object 130. Packaging asset 210 and/or other packaging assets (not shown) of aggregated content object 130 may comprise XML code defining hierarchical relationships between the various assets, such as to utilize one or more asset as a "library" asset, to facilitate use and reuse of various content assets as desired in the resulting multimedia content. Additionally or alternatively, packaging asset 210 and/or other packaging assets of aggregated content object 130 may comprise XML code defining use and/or interaction of the various content assets in order to aggregate these content assets into desired multimedia content.

Content assets of embodiments of the invention preferably include content, which when aggregated, provides desired multimedia content. Such content assets may be in any of a number of forms and/or formats. According to an embodiment of the invention, content assets may be in a format native to an authoring tool creating the aggregated content object, content assets may be in a format native to another authoring tool or other software application, content assets may be in a format adapted to be readily accessible to a number of authoring tools or other software application, and/or content assets may be in one or more standardized or open formats, such as may be directly accessible by a plurality of authoring tools or other software applications.

For example, although aggregated into aggregated content object 130 by multimedia authoring tool 110, content assets 221-224 provide content in a standardized format which is directly accessible by various authoring tools. Specifically, content assets 221 and 222 of the illustrated embodiment comprise images in the PG format, as is well known in the art, which remain directly accessible to such authoring tools as graphic authoring tool 180, such as may comprise the PHOTOSHOP® graphic editor software available from Adobe. Content asset 223 of the illustrated embodiment comprises sound in the MP3 format, as is well known in the art, which remains directly accessible to such authoring tools as sound authoring tool 150, such as may comprise the WAVEPAD sound editor software available from NCH Swift Pty. Ltd. Content asset 224 of the illustrated embodiment comprises video in the FLV format, as is well known in the art, which remains directly accessible to such authoring tools as multimedia authoring tool 140, such as may comprise the FLASH® development software.

Content assets 231 and 232 of the illustrated embodiment comprise content native to multimedia authoring tool 110. For example, content assets 231 and 232 may comprise "symbols," such as graphics, buttons, animations, etc., generated by multimedia authoring tool 110 which can be reused throughout the multimedia content provided by aggregated content object 130. Such symbols may additionally provide "library" assets which may be utilized in other multimedia content (not shown).

Content assets 231 and 232 of embodiments may comprise content which is created using multimedia authoring tool 110. For example, content assets 231 and/or 232 may comprise graphics comprised of vector graphics, bitmaps, etc. created using multimedia authoring tool 110. Additionally or alternatively, content assets 231 and/or 232 may incorporate and/or link to additional content.

Figure 3:
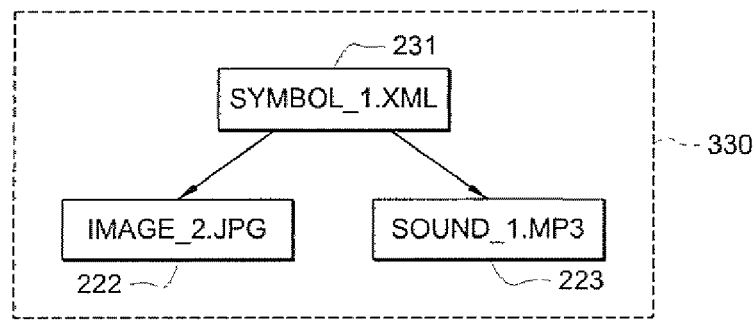
FIGS. 3 and 4 show detail with respect to logical assets according to embodiments of the present invention.

Directing attention to FIG. 3, content asset 231 is shown as defining a combination of content assets 222 and 223 to provide logical content asset 330. For example, content asset 231 of the illustrated embodiment comprises a manifest of assets which comprise logical content asset 330. Content asset 231 may comprise, for example, XML code providing reference, pointers, or links to each of assets 222 and 223, thereby identifying each of these assets with logical content asset 330. Accordingly, content asset 231 and/or other content assets of aggregated content object 130 may comprise XML code defining hierarchical relationships between various assets, such as to utilize one or more asset as a "library" asset, to facilitate use and reuse of various content assets as desired in the resulting multimedia content. Additionally or alternatively, content asset 231 and/or other content assets of aggregated content object 130 may comprise XML code defining use and/or interaction of the various content assets in order to aggregate these content assets into desired symbols or other composite content.

Content which is native to an authoring tool, such as multimedia authoring tool 110, is often provided in a proprietary format of the authoring tool (e.g., the FLA format utilized for symbol content by the FLASH® development software). However, content assets 231 and 232, and their associated logical content assets (e.g., logical content asset 330) of the illustrated embodiment are provided in a format adapted to be readily accessible to a number of authoring tools or other software application, here a markup language format. For example, as with the markup language based file format of aggregated content object 130, content assets 231 and 232 of embodiments of the present invention implement a markup language manifest to facilitate access to the logical content asset by various authoring tools. Additionally, the markup language of content assets 231 and 232 may define links and interaction among and between the assets forming the logical content assets. Accordingly, although content assets 231 and 232 may have been created using multimedia authoring tool 110, one or more of authoring tools 140-180 may be utilized to the logical content assets or portions thereof. That is, one or more authoring tools in addition to multimedia authoring tool 110 may be utilized to access logical content asset 330 as well as content assets 222, 223, and 231 thereof.

Figure 4:
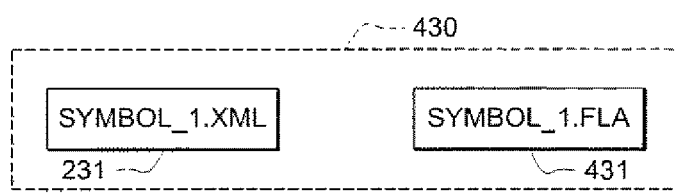

Asset configurations utilized according to embodiments of the invention are not limited to the single object (e.g., content assets 221-224) and hierarchical object (e.g., logical content asset 330) configurations shown above. For example, embodiments of the present invention may provide a multiple format asset configuration. Directing attention to FIG. 4, logical content asset 430 is shown comprised of content assets 231 and 431. Content assets 231 and 431 provide dual formats for particular content. That is, although providing the same content (e.g., text, image, sound, etc.) content asset 231 is provided in a first format (e.g., the aforementioned markup language based format providing accessibility to a number of software applications) and content asset 431 is provided in a second format (e.g., a binary or optimized format such as the FLA format used by the FLASH® development software). Such dual formats may provide the subject content in a format which is accessible to a number of authoring tools (e.g., authoring tools 140-180) while retaining advantages associated with the use of particular proprietary or optimized formats. For example, the FLA format used by the FLASH® development software may provide optimized loading and processing in multimedia authoring tool 110, and thus may be preferred for use therewith. Additionally or alternatively, the FLA format may provide backward compatibility with respect to earlier versions of the FLASH® development software. However, many of authoring tools 140-180 may not be adapted to access the FLA format. Accordingly, this content may also be provided in aggregated content object 130 in an open format as content asset 231.

The foregoing multiple format content assets are preferably treated as a single logical content asset by multimedia authoring tool 110 and/or aggregated content object 130. For example, aggregated content object 130 of embodiments operates to store content updates in each content asset of a multiple format logical asset when content is edited using multimedia authoring tool 110. Additionally, to ensure edits to content made by other authoring tools are synchronized, upon multimedia authoring tool 110 accessing aggregated content object 130, the assets of a multiple format asset may be analyzed for synchronization. According to one embodiment, multimedia authoring tool 110 directly analyzes the multiple format assets of a logical asset to identify an out of synchronization status and to cause a most recent version of the content as present in one of the assets to be propagated into the other assets of the logical asset. Additionally or alternatively, multimedia authoring tool 110 may analyze packaging or other aggregated content object information to identify an out of synchronization status.

Although the foregoing example is given with reference to dual formats, embodiments of the invention may utilize any number of asset formats in forming a multiple format logical asset. For example, embodiments may utilize a multiple format configuration in which multiple open formats are used in order to optimize the number of authoring tools that may access the content, in addition to one or more binary or optimized formats being used in a multiple format logical asset.

It should be appreciated that various asset configurations may be used in combination according to embodiments of the invention. For example, the foregoing multiple format content asset configuration may be used to provide multiple format logical content asset 430 including content asset 231, which itself comprises a hierarchical configuration in which content assets 222 and 232 are combined into logical content asset 330.

Moreover, the form and/or format of various content assets aggregated as part of aggregated content object 130 are not limited to those shown in the illustrative embodiments. Content assets utilized according to embodiments of the invention may comprise any number of forms and formats, such as PEG, MPEG, SWF, FLA, FLY, WMV, MP4, MP3, WAY, PNG, GIF, AI, TXT, etc. For example, a content asset utilized according to embodiments of the present invention may comprise graphics in the AI format, as is well known in the art, which is directly accessible to such authoring tools as graphic authoring tool 170, such as may comprise the ILLUSTRATOR® graphic editor software. Likewise, a content asset utilized according to embodiments of the present invention may comprise video in the MP4 format, as is well known in the art, which is directly accessible to such authoring tools as video authoring tool 160, such as may comprise the VIDEOREDO video editor software available from DRD Systems, Inc., Mendham, N.J.

It should be appreciated that form and format of content assets utilized according to embodiments of the invention are not limited to access by any particular authoring tool or even any particular type of authoring tool, provided such authoring tool is compatible with the particular format. For example, content asset 224 is discussed above as being accessible to another multimedia authoring tool, here multimedia authoring tool 140, which may additionally directly access one or more of content assets 221-223, 231, and/or 232. Likewise, one or more of sound authoring tool 150, video authoring tool 160, graphic authoring tool 170, and graphic authoring tool 180 may directly access content asset 224 as well as other ones of the content assets, according to embodiments of the invention.

Having described an aggregated content object and its associated assets provided according to an embodiment of the invention, operation of authoring tools in creating and editing such an aggregated content object according to embodiments will be described. It should be appreciated that, when implemented in software, elements of the present invention are essentially the code segments to perform the tasks or functions described herein. The code segments can be stored in a computer readable medium or transmitted by a computer data signal embodied in a carrier wave, or a signal modulated by a carrier, over a transmission medium, Such a computer readable medium may include any medium that can store or transfer information. Examples of a computer readable medium include an electronic circuit, a semiconductor memory device, a ROM, a flash memory, an erasable ROM (EROM), a floppy diskette, a compact disk CD-ROM, an optical disk, a hard disk, a fiber optic medium, etc. The computer data signal may include any signal that can propagate over a transmission medium such as electronic network channels, optical fibers, air, electromagnetic, radio frequency (RF) links, etc. The code segments may be downloaded via computer networks such as the Internet, an intranet, a local area network (LAN), a metropolitan area network (MAN), a wide area network (WAN), a wireless network, the public switched telephone network (PSTN), etc.

Figure 5:
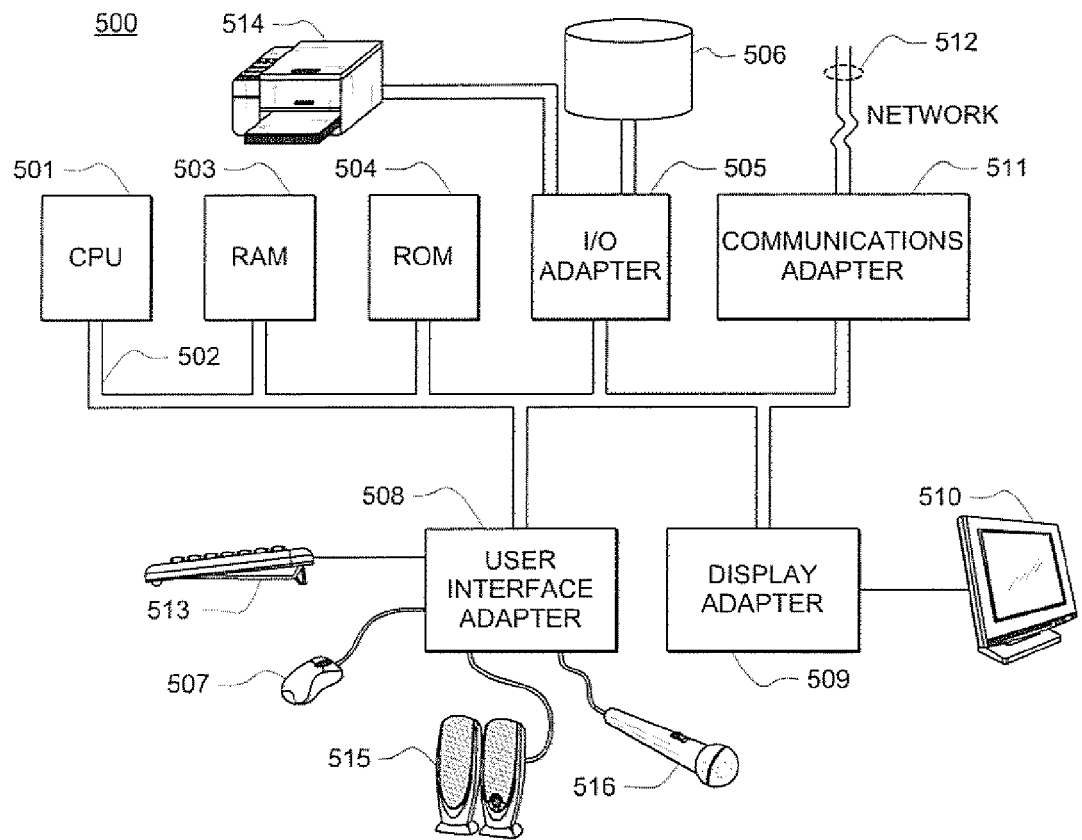
FIG. 5 shows a computer system adapted to use an embodiment of the present invention.

FIG. 5 illustrates computer system 500 adapted to use the present invention. Central processing unit (CPU) 501 is coupled to system bus 502. The CPU 501 may be any general purpose CPU, such as a PENTIUM processor available from Intel Corporation or a POWERPC processor available from the AIM alliance (Apple-IBM-Motorola). However, the present invention is not restricted by the architecture of CPU 501 as long as CPU 501 supports the inventive operations as described herein. Bus 502 is coupled to random access memory (RAM) 503, such as may comprise SRAM, DRAM, SDRAM, etc. Read only memory (ROM) 504 is also coupled to bus 502, such as may comprise PROM, EPROM, EEPROM, etc. RAM 503 and ROM 504 operate to hold user and system data and programs as is well known in the art.

Bus 502 is also coupled to input/output (I/O) controller adaptor 505, communications adapter adaptor 511, user interface adaptor 508, and display adaptor 509. I/O adapter adaptor 505 connects to storage devices 506, such as may comprise one or more of a hard drive, a CD drive, a floppy disk drive, a tape drive, to the computer system. I/O adapter 505 is also connected to printer 514, which would allow the system to print paper copies of information such as document, photographs, articles, etc. Note that the printer may be a printer (e.g. dot matrix, laser, etc.), a fax machine, or a copier machine. Communications adaptor 511 is adapted to couple computer system 500 to network 512, such as may comprise one or more of the PSTN, the Internet, a LAN, a MAN, a WAN, a wireless network, etc. User interface adaptor 508 couples user input devices, such as keyboard 513, pointing device 507, and microphone 516, to the computer system.

User interface adaptor 508 also provides sound output to a user via speaker(s) 515. The display adaptor 509 is driven by CPU 501 to control the display on display device 510.

Figure 6:
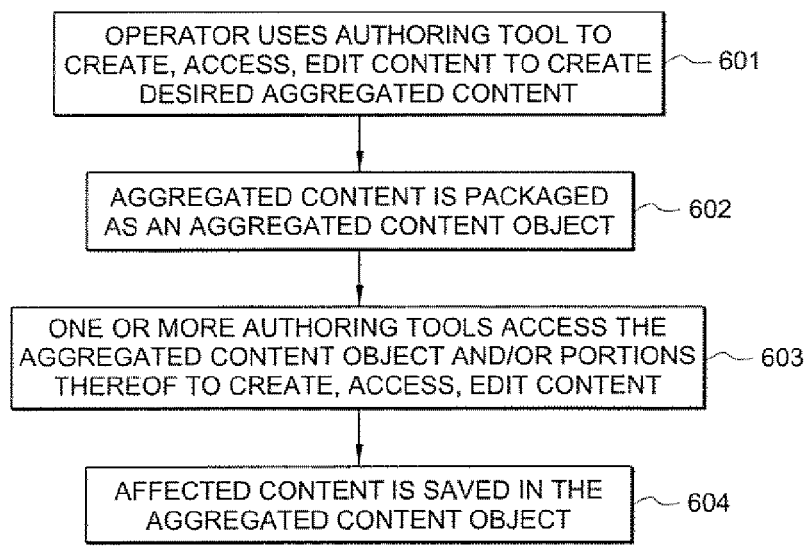
FIG. 6 shows a flow diagram of operation according, to an embodiment of the present invention.

Directing attention to FIG. 6, a method providing operation of authoring tools in creating and editing such an aggregated content object using a computer system, such as computer system 500, is shown. At block 601 of the illustrated embodiment, an operator uses an authoring tool to create, access, and/or edit content to create desired aggregated content. For example, an operator may load multimedia authoring tool 110 on computer system 500 and interact with multimedia authoring tool 110 to access various source content, such as source content 121-124, and/or create various "native" content to be aggregated. Multimedia authoring tool 110 may be adapted to access source content of various forms and/or formats using application programming interfaces (APIs) or other code configured to interface with desired source content. Once loaded or provided within multimedia authoring tool 110, the content (source and native content) becomes assets of the aggregated content. Various relationships and interactions may be defined among and between these assets using multimedia authoring tool 110 in providing the aggregated content.

At block 602 of the illustrated embodiment, the aggregated content is packaged as an aggregated content object. For example, an operator may interact with multimedia authoring tool 110 to save the aggregated content, such as to store the aggregated content on storage device 506, for later editing or revision. In operation according to a preferred embodiment of the invention, multimedia authoring tool 110 is adapted to create a container structure for the assets of the aggregated content, such as using a universal container format (UCF). According to one embodiment, multimedia authoring tool 110 is adapted to create aggregated content object 130 comprising a plurality of assets, such as assets 210, 221-224, 231, and 232, using a compressed "zip" container file format (e.g., creating a file object consistent with that resulting from operation of the PKZIP or WINZIP file compression software applications). The foregoing packaging of the assets into a single object may be utilized as a native storage mode of the authoring tool or as an optional storage mode, such as may be used for scenarios when additional authoring tool compatibility is desired.

Using such a container format according to embodiments of the present invention, the plurality of assets forming aggregated content object 130 may continue to be identifiable and accessible as individual assets, although aggregated content object 130 may readily be treated as a single object. Accordingly, multimedia authoring tool 110 preferably includes APIs or other code configured to interface with assets of various forms and formats and to provide such assets in such forms and formats within aggregated content object 130 created thereby. Accordingly, any number of authoring tools or other software applications which are compatible with the form or format of particular assets, such as content assets 221-224, 231, and/or 232, may access such assets within the container structure of aggregated content object 130 of embodiments.

In packaging aggregated content into aggregated content object 130, embodiments of the invention operate to include more than the aforementioned content assets therein. For example, embodiments of the invention operate to create one or more packaging assets useful in creating, accessing, managing, editing, and/or revising an aggregated content object. According to a preferred embodiment, multimedia authoring tool 110 is operable to create and/or edit a packaging asset, such as packaging asset 210, comprising a manifest of assets which comprise aggregated content object 130. Additionally or alternatively, multimedia authoring tool 110 is operable to create and/or edit a packaging asset, such as packaging asset 210 comprising information defining links and interaction among and between the assets. Accordingly, various relationships and interactions defined by an operator using multimedia authoring tool 110 among and between the assets in providing the aggregated content are stored as part of aggregated content object 130 of embodiments. The information provided in such packaging assets may additionally or alternatively define hierarchical relationships of the assets, define logical assets, etc.

At block 603 of the illustrated embodiment, one or more authoring tools accesses the aggregated content and/or portions thereof to create, access, edit, etc. content thereof. For example, multimedia authoring tool 110 may access aggregated content object 130 to enable an operator to aggregate additional content, edit content which has previously been aggregated, create new content, view or play the aggregated content or portions thereof, etc. Thereafter, the aggregated content, or affected portions thereof, may again be saved in aggregated content object 130, as shown in block 604.

In operation according to embodiments of the invention, any of authoring tools 140-180 may be used at block 603 to access aggregated content object 130, or particular portions thereof, to edit content which has previously been aggregated, view or play the aggregated content or portions thereof, etc. For example, where content asset 221 comprises a photograph, an operator may access graphic authoring tool 180, such as may comprise the PHOTOSHOP® graphic editor software, utilize a feature thereof to remove "red eye" from the photograph. Such edits to content asset 221 may be saved directly to aggregated content object 130 at block 604, thereby avoiding an operator having to re-import a revised copy of source content 121 into aggregated content object 130 using multimedia authoring tool 110. Moreover, because the assets are maintained somewhat independently within the container structure of aggregated content object 130 of embodiments, various different assets may be accessed simultaneously, such as by different authoring tools or other software applications.

In addition to providing advantages such as authoring tool compatibility, ease of editing, and simultaneous editing of multiple assets, the aggregated content objects of embodiments of the present invention provide a robust storage technique which has improved tolerance to data corruption. For example, a typical binary file used to store aggregated content is often rendered completely inaccessible when only a portion thereof is corrupted. However, because the assets are maintained somewhat independently within the container structure of an aggregated content object of embodiments of the present invention, various portions of the aggregated content object may become corrupted while assets thereof remain undamaged and fully accessible. Accordingly, such portions of a corrupted aggregated content object may be recovered and used to provide a new aggregated content object.

Moreover, embodiments of the present invention provide additional benefits, such as facilitating cross-compiling capabilities. For example, each of multimedia authoring tools 110 and 140 may provide a compile function wherein aggregated content is complied into binary code for execution by a corresponding multimedia runtime player, such as the FLASH® player or a browser. Because aggregated content object 130 of embodiments provides the aggregated content in a format which is accessible by both multimedia authoring tool 110 (e.g., FLASH® development software) and multimedia authoring tool 140 (e.g., the FLEX™ development software), either or both such authoring tools may be utilized to provide a compiled rendition of aggregated content object 130.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method comprising:
aggregating content, by a first authoring tool on a computer, to form aggregated content, wherein said content comprises source content provided in a plurality of different formats;
storing, at the computer, said aggregated content, by said first authoring tool, as an aggregated content object, wherein said aggregated content object includes a plurality of individually accessible content assets,
wherein said individually accessible content assets are provided in said plurality of different formats, wherein the individually accessible content assets comprise packaging assets, a packaging asset defining an individually accessible content asset as a library asset for use by others of the individually accessible content assets.

2. The method of claim 1, wherein said one or more packaging asset comprises information provided in a markup language.

3. The method of claim 1, wherein said plurality of different formats comprise at least one of JPEG, MPEG, SWF, FLA, FLV, WMV, MP4, MP3, WAY, PNG, GIF, AI, and TXT.

4. The method of claim 1, said method further comprising:
accessing a selected content asset using a second authoring tool.

5. The method of claim 4, wherein said first authoring tool comprises an authoring tool providing functionality for aggregating content and said second authoring tool comprises an authoring tool providing functionality adapted for editing a type of content of said selected content asset.

6. The method of claim 4, further comprising:
accessing another selected content asset using a third authoring tool.

7. The method of claim 6, wherein said second and third authoring tool access said assets simultaneously.

8. The method of claim 1, wherein one or more of said content assets comprise a logical asset comprised of multiple content assets.

9. The method of claim 8, wherein said logical asset is defined using information in a markup language.

10. The method of claim 8, wherein said multiple content assets are provided in a hierarchical relationship.

11. The method of claim 8, wherein said multiple content assets comprise multiple formats for a same content.

12. A system comprising:
an authoring tool on a computer and adapted to access a plurality of source content files and to aggregate content of said source content files into aggregated content; and
an aggregated content object generated by said authoring tool and stored on the computer, said aggregated content object containing said aggregated content in a plurality of individually accessible content assets; and
a second authoring tool on the computer, said second authoring tool adapted to directly access at least one content asset of said plurality of content assets, wherein said authoring tool and said second authoring tool provide one or more different authoring functions as compared to one another.

13. The system of claim 12, wherein said source content files are provided in a plurality of different formats, and wherein said content assets are provided a same format of said plurality of different formats as corresponding ones of said source content files.

14. The system of claim 12, wherein said authoring tool is further adapted to create content assets of said plurality of individually accessible content assets which are directly accessible by a plurality of different authoring tools.

15. The system of claim 14, wherein said content assets created by said authoring tool comprise markup language information defining one or more aspects of said content assets.

16. The system of claim 12, wherein said authoring tool comprises a compiler adapted to provide a first compiled rendition of said aggregated content object, and wherein said second authoring tool comprises a compiler adapted to provide a second compiled rendition of said aggregated content object.

17. A method comprising:
accessing a plurality of source content files using a first authoring tool on a computer, wherein said plurality of source content files include source content files of different formats;
creating, on the computer, aggregated content from content of said source content files using said first authoring tool;
packaging said aggregated content into an aggregated content object using said first authoring tool on the computer, wherein said aggregated content object includes content assets corresponding to said source content files, said content assets provided in a same format as a corresponding one of said source content files; and
accessing at least a portion of said aggregated content object using a second authoring tool on the computer, wherein said second authoring tool provides different functions than said first authoring tool.

18. The method of claim 17, wherein said different functions comprise functions specifically adapted for editing content in a particular one of said different formats.

19. The method of claim 17, wherein said packaging comprises:
providing one or more packaging asset identifying said content assets.

20. The method of claim 19, wherein said packaging asset comprises a markup language manifest of said content assets.

21. A non-transitory computer readable medium storing computer readable code storing aggregated content, said computer readable code comprising:
program code for aggregating content, by a first authoring tool on a computer, to form aggregated content, wherein said content comprises source content provided in a plurality of different formats;
program code for storing, at the computer, said aggregated content, by said first authoring tool, as an aggregated content object, wherein said aggregated content object includes a plurality of individually accessible content assets, wherein said individually accessible content assets are provided in said plurality of different formats, wherein the individually accessible content assets comprise packaging assets, a packaging asset defining an individually accessible content asset as a library asset for use by others of the individually accessible content assets.

22. The method of claim 1 wherein the packaging asset defines interactions among individually accessible content assets identified by the packaging asset.

23. The method of claim 1 wherein the individually accessible content asset comprises a symbol which can be reused throughout the aggregated content, wherein the symbol comprises the library asset.

24. The method of claim 12 wherein a content asset included in the aggregated content is editable by said authoring tool but not editable by said second authoring tool.

25. The method of claim 22 further comprising the authoring tool directly saving an edit made to the content asset in the aggregated content.

* * * * *